Patented May 24, 1927.

1,629,884

UNITED STATES PATENT OFFICE.

HEINRICH POLIKIER, OF LEIPZIG, AND HERBERT HÄHLE, OF DESSAU-ZIEBIGK, GERMANY, ASSIGNORS TO I. G. FARBENINDUSTRIE AKTIENGESELLSCHAFT, OF FRANKFORT-ON-THE-MAIN, GERMANY.

TRIARYL-METHANE DYES FROM TETRAALKYL-DIAMINO-BENZOPHENONE AND ARYLATED-ETHYLENE-DIAMINES.

No Drawing. Application filed May 6, 1926, Serial No. 107,227, and in Germany March 14, 1925.

The invention relates to valuable violet dyestuffs of the triarylmethane series made by condensing a tetraalkyl-4.4'-diamino-benzophenone with an arylated ethylene-diamine, in which there is no substituent in the aryl-residue in para-position to the nitrogen. The arylenediamines applied for condensation correspond to the general formula:

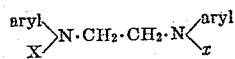

X representing hydrogen, alkyl or aralkyl.
The reaction occurs between equal molecular proportions with formation of a dyestuff of the general constitution:

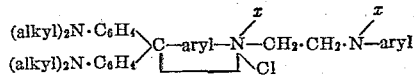

X representing hydrogen, alkyl or aralkyl.
The new dyestuffs are characterized by remarkable clarity, colour strength and fastness to washing. In their other dyeing properties they approximate the Victoria blue group (see Schultz, "Farbstofftabellen", 6. edition, 1. Vol. No. 558 and 559).

The following examples illustrate the invention without limiting it, the parts being by weight:

1. 27 parts of tetramethyl-4.4'-diamino-benzophenone, 24 parts of dimethyldiphe-nylethylenediamine and 7 parts of toluene are melted together. To the mixture cooled to 60° C. are added 18 parts of phosphorus-oxychloride and the mass is stirred on the water bath until it becomes solid. It is then dissolved in 500 parts of water and the dyestuff is precipitated from the solution by adding sodium acetate and sodium chloride. It separates in the form of a resin having a golden lustre which can be dried and ground. It dyes cotton mordanted with tannin, or wool, violet shades.

2. 27 parts of tetramethyl-4.4'-diamino-benzophenone, 27 parts of diethyldiphenyl-ethylenediamine and 7 parts of toluene are melted together. At about 60° C. there are added 18 parts of phosphorus oxychloride and the remaining operations resemble those described in Example 1. The dyestuff produced is of a somewhat more blue tint than that of the dyestuff of Example 1.

3. 27 parts of tetramethyl-4.4'-diamino-benzophenone, 39 parts of dibenzyldiphenyl-ethylenediamine and 15 parts of toluene are heated in the manner described in the previous examples with 18 parts of phosphorus-oxychloride. During the working up the dyestuff separates in a pure and solid form, after its solution in hot water has been stirred for some time. It dyes tannin-mordanted cotton, or wool, blue violet shades. By sulphonation it is converted into a dyestuff which dyes wool in an acid bath very clear blue violet tints.

4. 27 parts of tetramethyl-4.4'-diamino-benzophenone, 25 parts of di-ortho-tolyl-ethylenediamine, 10 parts of toluene and 18 parts of phosphorus-oxychloride are worked up as described in Example 1. From the solution obtained by stirring the product in hot water the dyestuff separates after the addition of some common salt. It yields reddish violet dyeings.

Dyestuffs may similarly be made from among others the 3-tolyl-, 3-chloro-phenyl- or xylyl- derivative of ethylenediamine, and instead of the tetramethyl-4.4'-diamino-benzophenone there may be used with similar result the corresponding tetraethyl compound.

What we claim is,—
1. The herein-described new violet dyestuffs of the triarylmethane series which correspond to the general formula:

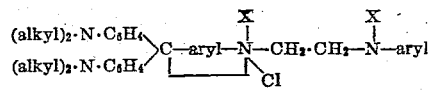

(x representing hydrogen, alkyl or aralkyl), and which are substantially identical with the dyestuffs manufactured by condensing equal molecular proportions of a tetraalkyl-4.4′-diaminobenzophenone with an arylated ethylenediamine corresponding to the general formula:

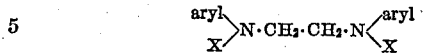

(X representing hydrogen, alkyl or aralkyl) having no substituent in the aryl residue in para-position to the nitrogen.

2. The herein-described new violet dyestuffs of the triarylmethane series which correspond to the general formula:

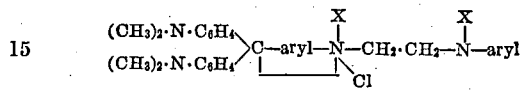

(X representing hydrogen, alkyl or aralkyl), and which are substantially identical with the dyestuffs manufactured by condensing equal molecular proportions of tetramethyl-4-4′-diaminobenzophenone with an arylated ethylenediamine corresponding to the general formula:

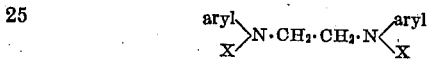

(X representing hydrogen, alkyl or aralkyl) having no substituent in the aryl residue in para-position to the nitrogen.

3. The herein-described new violet dyestuffs of the triarylmethane series which correspond to the general formula:

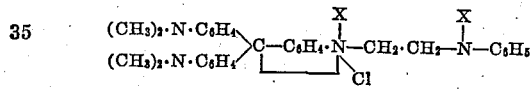

(X representing hydrogen, alkyl or aralkyl), and which are substantially identical with the dyestuffs manufactured by condensing equal molecular proportions of tetramethyl-4.4′-diaminobenzophenone with a diphenylethylenediamine corresponding to the general formula:

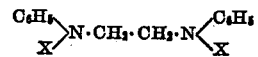

(X representing hydrogen, alkyl or aralkyl).

4. The herein-described new violet dyestuffs of the triarylmethane series which correspond to the general formula:

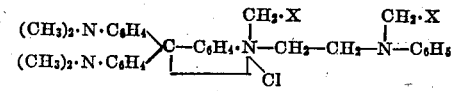

(X representing hydrogen, alkyl or phenyl), and which are substantially identical with the dyestuffs manufactured by condensing equal molecular proportions of tetramethyl-4.4′-diaminobenzophenone with a diphenylethylenediamine corresponding to the general formula:

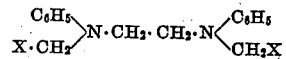

(X representing hydrogen, alkyl or phenyl).

5. The herein-described new violet dyestuff of the triarylmethane series which corresponds to the formula:

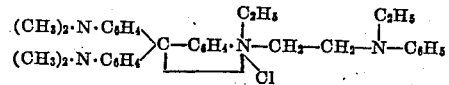

which dyestuff is substantially identical with the dyestuff manufactured by condensing molecular proportions of tetramethyl-4.4′-diaminobenzophenone with diphenyl-diethylethylenediamine.

In testimony whereof we affix our signatures.

HEINRICH POLIKIER.
HERBERT HÄHLE.